United States Patent [19]

Koppelomäki

[11] Patent Number: 4,673,056

[45] Date of Patent: Jun. 16, 1987

[54] LOUDSPEAKER SYSTEM

[76] Inventor: Koppelomäki, Almgatan 23, S-333 00 Smalandsstenar, Sweden

[21] Appl. No.: 822,401

[22] PCT Filed: Mar. 29, 1985

[86] PCT No.: PCT/SE85/00143
§ 371 Date: Dec. 24, 1985
§ 102(e) Date: Dec. 24, 1985

[87] PCT Pub. No.: WO85/05004
PCT Pub. Date: Nov. 7, 1985

[30] Foreign Application Priority Data

Apr. 25, 1984 [SE] Sweden ............................. 84022562

[51] Int. Cl.[4] .............................................. H05K 5/00
[52] U.S. Cl. .................................. 181/141; 181/145
[58] Field of Search ............... 181/141, 144, 148, 145; 387/86

[56] References Cited

U.S. PATENT DOCUMENTS

| | | | |
|---|---|---|---|
| 3,268,229 | 8/1966 | Funk | 181/144 X |
| 4,005,761 | 2/1977 | Okanoto et al. | 181/141 |
| 4,056,165 | 11/1977 | Okanoto et al. | 181/141 |
| 4,099,026 | 7/1978 | Persson et al. | 179/146 E |
| 4,100,372 | 7/1978 | Hypolite | 181/148 X |

FOREIGN PATENT DOCUMENTS 3028985 7/1980 Fed. Rep. of Germany .
7603422 4/1978 Sweden .
1151734 5/1969 United Kingdom .

Primary Examiner—Benjamin R. Fuller
Attorney, Agent, or Firm—Burns, Doane, Swecker & Mathis

[57] ABSTRACT

The disclosure relates to a vehicle loudspeaker system which is designed as an arc and is mounted in the vehicle transversely of the direction of travel of the vehicle so that the upper face (7) is connected to the inner roof of the vehicle. The loudspeaker system is provided with at least two loudspeakers (5) and, at its end, downwardly directed anchorage portions (2) which are screwed in place in the transitional regions between the vehicle roof and walls.

According to the invention, the loudspeaker system is provided with rigid and enclosed end portions (1) with the loudspeaker (5) and anchorage portions (2). Between the end portions, there is disposed a length-adjustment portion consisting of a form-stable portion (8) which telescopically cooperates with the end portions, and a forming member (3) which covers the form-stable portion and which, at its ends continuously connects with the end portions (1). The form-stable portion (8) is designed as a tube or rod, while the forming member consists of semi-hard material of approximately uniform cross section throughout its length. After length adjustment of the form-stable portion in relation to the end portions, this is cut to the intended length.

19 Claims, 5 Drawing Figures

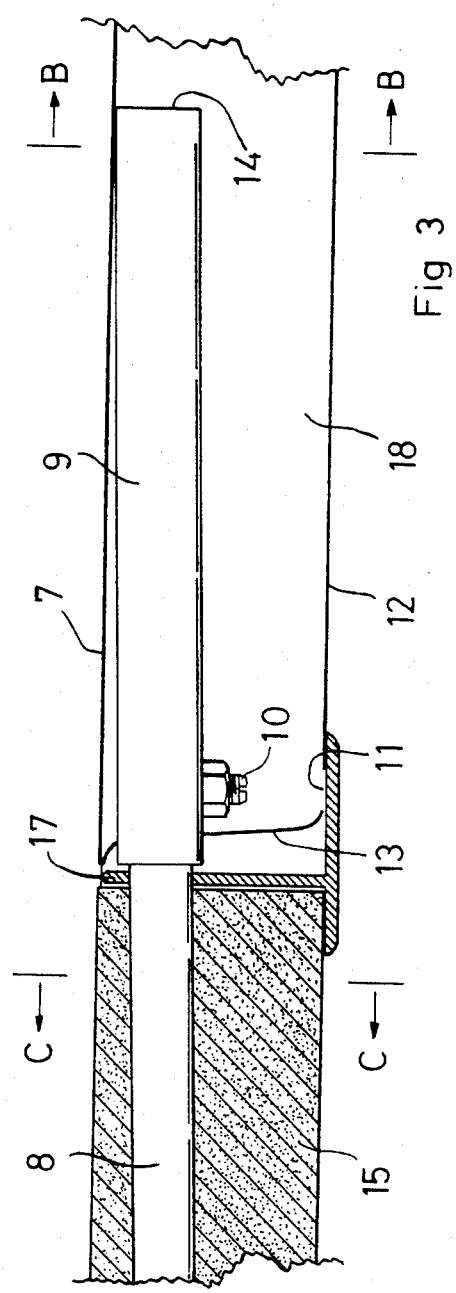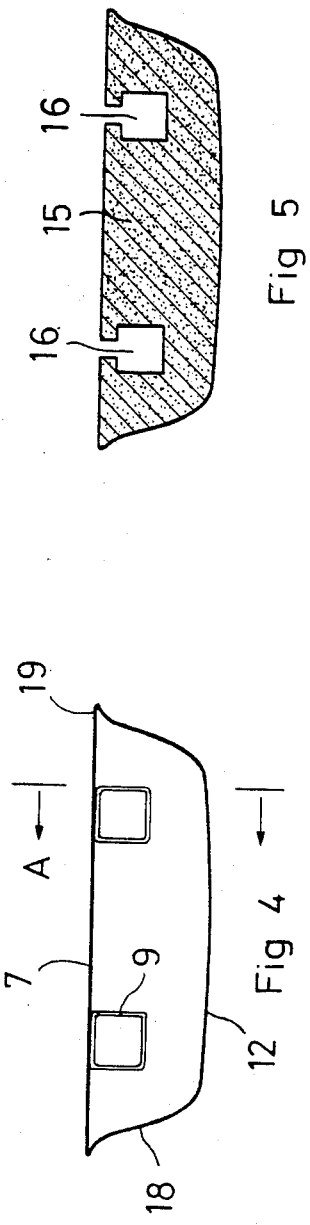

LOUDSPEAKER SYSTEM

TECHNICAL FIELD

The present invention relates to a loudspeaker system which is intended for use in vehicles, is elongate and designed so as to be mounted in the inner roof of the vehicle, transversely in relation to the direction of travel of the vehicle, and which is primarily intended for steroephonic sound reproduction.

BACKGROUND ART

There are many different types of prior art loudspeakers for use in vehicles. As far as sound reproduction is concerned, one of the more successful members of the prior art is a loudspeaker system which is designed as an elongate arc, which has an upper side connected to the inner roof of the vehicle and has downwardly directed anchorage lugs which are intended for maintaining the loudspeaker arc in the longitudinal beam which, as a rule, are to be found in the region between the roof of the vehicle and its side walls. Such a loudspeaker arc is, generally, equipped with loudspeakers for stereophonic sound reproduction.

The above-described prior art loudspeakers are disclosed in Swedish Patent Specification No. 7603422-2 and are, in practice, produced by the vacuum forming of a plastics material. In order that the loudspeaker arc be capable of withstanding the mechanical forces caused by the loudspeaker units when the loudspeaker system is in use, the plastics material employed must be of some considerable thickness, which entails, in practice, that the anchorage lugs directed downwardly from the loudspeaker arc can only be employed with extreme difficulty (considerable risk for crack formation) in many vehicles in which there are tight radii of curvature in the area of transition between the inner roof of the vehicle and its side walls.

The prior art loudspeaker arcs are of one-piece construction, which entails that, generally speaking, they must be specially adapted to each individual vehicle model. It is easy to understand that this involves considerable problems not only as regards tool costs and storage, but also as regards transport, because of the size of the loudspeaker arcs.

OBJECT OF THE PRESENT INVENTION

The object of the present invention is to realise a loudspeaker system which makes full use of the great advantages of the above-mentioned loudspeaker arc, as regards sound reproduction, but which is designed in such a manner as to obviate prior art drawbacks.

SOLUTION

This object is achieved according to the present invention if the loudspeaker system, which is designed so as to be connected, with its upper face, to the inner roof of the vehicle on mounting with the longitudinal direction transverse in relation to the direction of travel of the vehicle, and is provided with at least two loudspeakers and anchorage portions for anchorage of the loudspeaker system to an anchorage member in opposing transitional regions between the side walls and roof of the vehicle, the invention being characterized in that the loudspeaker system has, at its both ends, a substantially rigid and enclosed unit with at least one loudspeaker and an anchorage portion in one end; and that both of the ends of the rigid unit turned to face away from the anchorage portions are interconnected by the intermediary of an interjacent portion of adaptable length.

One particularly simple embodiment of the loudspeaker system according to the present invention is characterized in that the interjacent portion comprises at least one form-stable portion which is telescopically connected to both of the rigid units, and one forming member which, at least downwardly, covers the form-stable portion and with its ends substantially continuously connects with both of the rigid units.

According to this embodiment of the present invention, it suitably applies that the form-stable portion is of rod or tubular configuration and that it is accomodated, at its ends, in corresponding opinings in the rigid units, and that the forming member is manufactured of a semi-hard, resiliently yieldable material and is of approximately uniform cross section throughout its length.

A modified embodiment of the present invention is suitably characterized in that the form-stable portion is in the form of a plate which, with opposing end portions, is accommodated in corresponding openings in the rigid units, and is fixable therein by means of snap or pushing connections; and that the forming member is maufactured of a semi-hard, resiliently yieldable material and is of approximately uniform cross section throughout its length.

In order to permit substantially free adaptation of the loudspeaker system to different vehicle models, irrespective of the radius of curvature and other design features between the inner roof and the side walls of the vehicle, it is a further suitable characterizing feature of the present invention that both of the anchorage portions enjoy considerable flexibility so as to permit configuration adaptation.

BRIEF DESCRIPTION OF THE ACCOMPANYING DRAWINGS

The invention will now be described in greater detail below, with reference to the accompanying drawings, in which FIG. 1 illustrates the right-hand half of the subject matter of the present invention, seen in the direction of travel of the vehicle, FIG. 2 shows, in a corresponding view to that of FIG. 1, the subject matter of the present invention with an interjacent portion dismantled, FIG. 3 is a cross section through the subject matter of the present invention, taken substantially along the sentional marking A—A in FIG. 4, FIG. 4 is a cross section through the subject matter of the present invention, taken substantially along the sectional marking B—B in FIG. 3, FIG. 5 is a cross section through the subject matter of the present invention, taken substantially along the sectional marking C—C in FIG. 3.

DESCRIPTION OF PREFERRED EMBODIMENT

Figure 1:
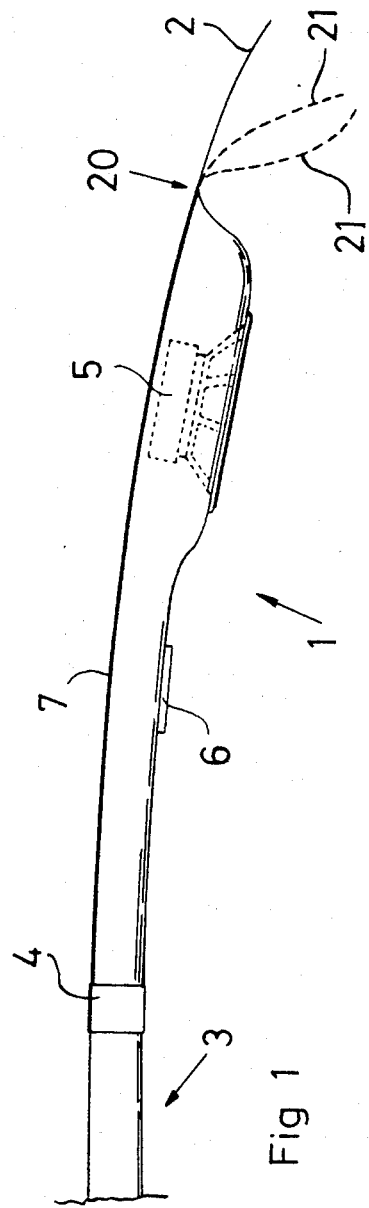

It will be apparent from FIG. 1, which approximately illustrates the right-hand half of the subject matter of the present invention, that the invention comprises a unit 1 which is disposed at each end, is substantially rigid and enclosed, this unit having, at its one end, an anchorage portion 2 and, at its other end, being connected to an interjacent portion 3. Suitably, the joint region between this rigid unit 1 and the interjacent portion 3 may, for aesthetic reasons, be concealed by a masking portion 4. The left-hand portion of the interjacent portion 3 (not shown on the Drawings) connects with a further rigid unit which is in mirror-reverse relationship to the unit shown on the Drawing, so that, thereby, the loudspeaker system will be symmetric about a vertical plane in the centre line of vehicle and parallel to its direction of travel.

The loudspeaker system according to the present invention has, in each one of the rigid units 1, at least one, but preferably two, and possibly more loudspeakers, a base and middle register unit 5 being, there, illustrated by ghosted lines in FIG. 1. Correspondingly, the reference numeral 6 indicated a desiccant unit mounted in the rigid unit 1.

The vehicle roofs in which the subject matter of the present invention is to be mounted are, as a rule, of approximately the same radius of curvature or arching along at least the central portion, while, on the other hand, the transition regions between the vehicle roof and its side walls may vary widely as regards arching and other appearance. This entails that the upper face 7 of both of the rigid units 1 may be given a gently arched configuration which constitutes a type of "average arching" which can be fitted to a very large number of different vehicle roofs, on condition that the anchorage portions may be readily adaptable. Furthermore, adaptation of the interjacent portion 3 may also be necessary to some extent, as regards its curvature or arching. As a result, the upper contour 7 of the total body of the loudspeaker system may be considered as composed of three different physical extends, in which the two outer extents are the upper contours of the two rigid units 1 which have a fixed arching, while the central extent, as will be more readily apparent below, may be arched in a manner which is adapted to meet the contours of the vehicle model in question and whose length may, moreover, be variable.

As was intimated above, the interjacent portion 3 is slightly flexible without necessarily being so easily deformable that the secure retention and upward urging of the loudspeaker system towards the vehicle roof is jeopardised when both of the anchorage portions are fixed in the transitional regions between the vehicle roof and its side walls. Thus, the interjacent portion 3 is sufficiently rigid to allow for the loudspeaker system to be urged up into tight abutment against the vehicle roof without the need of other anchorage points than those as are provided in the anchorage portions 2.

Figure 2:
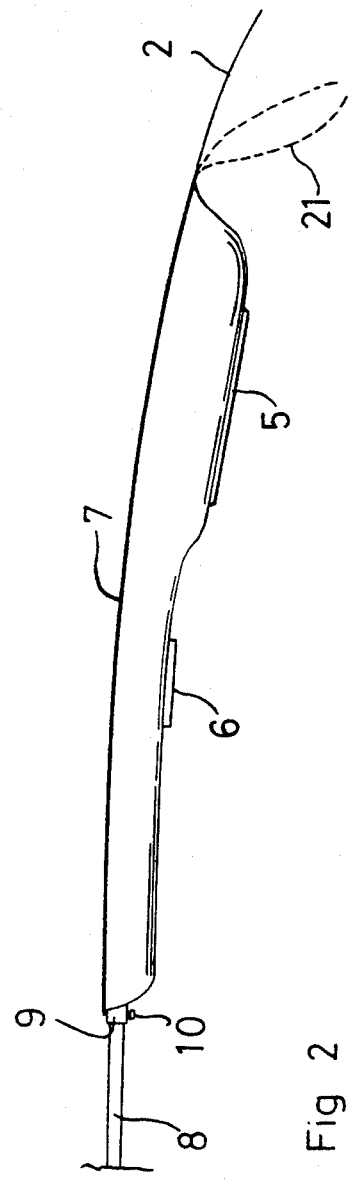

To impart such properties to the interjacent portion 3, this portion comprises, as will be apparent from FIG. 2, at least one, but preferably two rods or tubes 8 which are telescopically accommodated in sleeves 9 extending out from the rigid units 1. The sleeves 9 are suitably provided with stop screws 10 so that the rod or rods may thereby be positionally fixed in the sleeves.

A somewhat modified embodiment of the anchorage of the rods 8 in the rigid units 1 is apparent from FIG. 3 which demonstrates that the stop screws 10 are placed interiorly in the rigid units 1 and that they are accessible through an opening 11 in the underface 12 of the rigid unit.

According to the invention, the rigid units should, as far as possible, be enclosed, in order thereby to make for superior sound quality. This entails that the passage of the sleeves 9 through the end wall 13 of the rigid units should suitably be fully sealed, as should also suitably be the case with the inner end of the sleeves 9 so that these are closed by means of an endpiece 14. Positional fixing of the inner end of the sleeves 9 may be effected in a number of different ways, for example by welding, if the material in the rigid units is of sheet metal.

It will be apparent from the accompanying drawings that the interjacent portion, apart from the two rods or tubes 8, also includes a forming member 15 which may be suitably manufactured of semi-hard foam plastic. The forming member 15 should be of a cross sectional configuration (see FIG. 5) which as closely as possible approximates the cross sectional configuration of the two rigid units and should, for purposes of simplicity in manufacture, be of essentially constant cross sectional configuration throughout their entire length. To permit retention of the forming member 15 in a simple manner on the two rods or tubes 8, the forming member is suitably provided with longitudinal recesses 16 which may be likened to T-grooves. As a result of the eleasticity or yieldability of the forming member, it will hereby be possible to press this portion over the two rods 8 for the purposes of fixed anchorage.

To render the transitional region between the interjacent portion 3 and the two rigid units 1 as aesthetically attractive as possible, use is suitably made, according to the present invention, of a masking portion 4 which extends in over immediately adjacent end regions of the interjacent portion and the rigid unit. To anchor the masking portion 4, this is suitably provided with arms directed towards the roof of the vehicle, the arms being provided with holes for the passage of the rods or tubes 8. Alternatively, the arms 17 may be provided, at their ends pointing towards the roof of the vehicle, with hooks or catches which cooperate with the rods 8, the ends of the sleeves 9 or some specially provided member on the rigid units for anchoring the masking portion 4.

Naturally, the two rods or tubes 8 shown on the drawings may alternatively be substituted by other numbers, for example two, three or possibly more. A further conceivable alternative is also the employment of a single tube or rod, its cross section being suitably non-rotation symmetrical.

In another alternative to the use of the rods or tubes 8, an elongate plate be employed, it preferably being produced of metal and being insertible in the rigid units through openings in their end walls 13. Positional fixation of the plate in each of the rigid units may be realized either by the use of screw connections or by the use of snap or push-in connections. As an example of one such connection, it might be mentioned that the plate may suitably be provided with a series of holes in each end which extend transversely of the direction of travel of the vehicle and in which a fixed projection disposed in the rigid unit 1 is insertible in any optional hole in the series, so that the protrusion of the plate outside the rigid unit may be varied.

If a plate used in this manner is curved slightly more than is necessary in order that the upper face of the loudspeaker system can connect to the inner roof of the vehicle, and if the plate is made of a slightly yieldable material, this will atation a satisfactory degree of reliablity to ensure that the loudspeaker system is urged securely against the inner roof of the vehicle when its two anchorage portions are positionally fixed upwardly urged as far as possible at the transitional region between the vehicle roof and its side. Hereby, the entire loudspeaker system will only be exposed to pressure loadings, i e pressure loadings in the jointing between the rigid units and the interjacent portion and also pressure loadings against the two anchorage portions 2.

According to the invention, the two rigid units may suitably be manufactured of sheet metal material, where the side walls 18, underface 12 and end wall 13 are of one-piece manufacture, which may suitably be slightly flared at the connection to the upper face 7. The joint between these two parts is suitably effected by welding, whereafter projecting residual material is cut approximately in the middle of the weld, so as thereby to obtain an even edge for the loudspeaker system. In this embodiment, both of the anchorage portions 2 should be produced in the same piece as the underface 12 and consist of the same sheet metal material so that, thereby, the ancorage portions will be manifestly flexible so that they may readily be formed, without the risk of crack formation, fracture or other damage, to follow the contour 21 of the transitional region between the side walls of the vehicle and its inner roof. The upper face 7 of the rigid units is, here, suitably welded to the anchorage portions 2 and the underface 12 in the region as shown by the arrow 20 (see FIG. 1).

To ensure reliable tightness in both of the rigid units, the masking portion 4 may, naturally, also be provided with snap members which extend in through the openings provided in the underface 12 and which moreover serve the purpose of rendering the screw 10 accessible.

As has been intimated above, both of the rigid units have their upper face 7 arched in a manner which makes for fitting configuration with a very large number of vehicle roofs. This is possible in that the extent of the rigid unit in the width direction of the vehicle is relatively slight and in many vehicle models does not amount to more than a third of the inner width of the vehicle. As was further intimated above, the interjacent portion 3 is slightly flexible or deformable quite simply in that the two rods 8 or the plate can be bent by hand in conjunction with mounting of the loudspeaker system. Since, moreover, the forming member 15 is made of a resiliently yieldable material, this may be adapted to the design of the rids 8 or the plate without any problems whatsoever.

As is well-known, different vehicle modes have different inner roof widths and, according to the invention, this disparity is compensated for in that the rods 8 or the plate may be shifted varying distances into the sleeves 9 in the rigid unit, whereby the total length of the loudspeaker system may be adapted exactly to meet the vehicle roof in question. If, in this instance, the forming member 15 were to provide to be too long, it can, in certain cases, be compressed so that it, despite an inconsiderable excess length, may be placed on the rods. Alternatively, the forming member may, naturally, quite simply be shortened by being cut, sawn or severed in any other manner. Since, furthermore, the two anchorage portions 2 are made of a flexible material, for example, sheet metal, these may also be very simply shaped so that they closely approximate the contour of the transitional region between the roof of the vehicle and its side walls.

The invention may be modified without departing from the spirit and scope of appended claims. Thus, it is not necessary, as has been intimated above, to manufacture the two rigid units from sheet metal material, but these may also, naturally, be produced in plastics, for example by injection moulding, vacuum moulding or in any other suitable manner. In this alternative, the downwardly visible part of the interjacent portion 3 may be manufactured in oen piece with the underface 12 of the two rigid units, the interjacent portion in this embodiment being designed as a folded bellows so that its length may thereby be adapted to meet particular needs. In this embodiment, the interjacent portion may, naturally, also be bent as required, rods 8 or a plate being, however, necessary to provide the subject matter of the present invention with the requisite strength.

Naturally, the interjacent portion 3 could be separate from the rigid units and composed of bellows shaped, somewhat compressible sections which are selected and combined so that the interjacent portion is given the intended length. Such sections are provided with snap connections for connecting them together and for fastening them on the rods 8.

If the rigid units are manufactured of plastics, it is hardly possible to manufacture the anchorage portions 2 in one piece with them, since, in such an event, these could hardly be given sufficient flexibility but would run the risk of being snapped off, in particular in cold weather. For this reason, the anchorage portions 2 may suitably be manufactured as separate units, preferably of sheet metal, which are insertible in slot-shaped mountings in the rigid units and are lockable therein suitably by means of snap connections. In this context, it should be observed that no other loading that pure pressure loading need be feared in the joint region between the anchorage portions and the rigid units, for which reason that connection which may be necessary need, generally speaking, only fulfill the function of "transport securement".

In the above description has been postulated that the inner roof of the vehicles has approximately the same shape and curvature. In practice this could be considered as true provided the inner roof is soft. In such cases, however, where the roof is hard it will be necessary, for aesthetic reasons, to have a more snug fit between the upper side of the loudspeaker and the roof. To solve this problem use could be made of a contact strip fasten on the top side of the loudspeaker along the longitudinal side edges thereof. Such a contact strip should, of course, not extend down on the two anchorage portions 2 as those are flexible.

The contact strips should be made of plastic or another resilient material and should be easily deformable so as to to press the loudspeaker down too much from the roof. The contact strips could be shaped as tubes, folded bellows or could be made from a foamy material. If the rigid units 1 are made from plastic the contact strips are suitably made integral with the longitudinal side walls of the rigid units.

According to the invention it is also possible to make the contact strips from a harder material and then, when mounting the loudspeaker on the roof, remove certain portions so that the contact strips will have a shape closely following the shape of the roof.

What is claimed is:

1. A speaker system adapted to be mounted to a ceiling of a vehicle, said vehicle having transition regions between the ceiling and side walls of the vehicle, said speaker system comprising: at each end thereof a downwardly extending fastening portion for fastening the speaker system to opposed transition regions of the vehicle; two speaker cabinets, each of said speaker cabinets being connected to one of said fastening portions; at least one speaker element being provided in each of said speaker cabinets; connecting means for connecting said speaker cabinets with each other, said connecting means and said speaker cabinets being telescopingly arranged to adjust the length of said speaker system.

2. The speaker system of claim 1, wherein said connecting means defines means for urging a mid portion of said speaker system toward the ceiling of the vehicle.

3. The speaker system of claim 2, wherein said speaker cabinets have upper surfaces profiled to contact the ceiling of the vehicle.

4. The speaker system of claim 2, wherein said connecting means includes a substantially rigid member for providing a biasing force toward the ceiling, said substantially rigid member being telescopingly received in the speaker cabinets, said substantially rigid member and said speaker cabinets having cooperating interlocking means for fastening the speaker cabinets to said substantially rigid member at selected positions along the length of said rigid member.

5. The speaker system of claim 2, wherein said connecting means includes a cover member provided between adjacent end portions of said speaker cabinets, said cover member having a cross-sectional shape substantially conforming with a cross-sectional shape of said adjacent end portions of said speaker cabinets.

6. The speaker system of claim 5, wherein said cover member receives said substantially rigid member, said substantially rigid member being fastened to at least one of said speaker cabinets.

7. The speaker system of claim 2, wherein said fastening portions are received in corresponding recesses in said speaker cabinets.

8. A speaker system adapted to be mounted to a ceiling of a vehicle, said vehicle having transition regions between the ceiling and side walls of the vehicle, said speaker system comprising: at each end thereof a fastening portion for fastening the speaker system to opposed transition regions of the vehicle; two speaker cabinets, each of said speaker cabinets being connected to one of said fastening portions; at least one speaker element being provided in each of said speaker cabinets; means for interconnecting said speaker cabinets, said interconnecting means including a substantially rigid member, said speaker cabinets and said substantially rigid member having cooperating interlocking means for fastening said speaker cabinets to said substantially rigid member at selected locations along the length of said rigid member.

9. The speaker system of claim 8, further comprising a cover member extending between adjacent end portions of said speaker cabinets, said cover member having a cross-sectional shape substantially conforming with a cross-sectional shape of said adjacent end portions of said speaker cabinets, said cover member receiving said substantially rigid member.

10. The speaker system of claim 8, wherein said fastening portions are received in corresponding recesses in said speaker cabinets, said fastening portions being arranged to extend downwardly from said speaker cabinets.

11. The speaker system of claim 8, wherein said speaker cabinets have upper surfaces adapted to contact the ceiling of the vehicle.

12. A speaker system adapted to be mounted to a ceiling of a vehicle, said vehicle having transition regions between the ceiling and side walls of the vehicle, said speaker system comprising: at each end thereof a fastening portion for fastening the speaker system to opposed transition regions of the vehicle; two speaker cabinets, each of said speaker cabinets being connected to one of said fastening portions; at least one speaker element being provided in each of said speaker cabinets; means for interconnecting with said speaker cabinets, said interconnecting means including a substantially rigid member, said speaker cabinets provided with means for telescopingly receiving said rigid member in the speaker cabinets, said substantially rigid member and said speaker cabinets having cooperating interlocking means for fastening said speaker cabinets to said substantially rigid member at selected locations along the length of said rigid member.

13. The speaker system of claim 12, wherein said speaker cabinets have upper surfaces adapted to contact the ceiling of the vehicle.

14. The speaker system of claim 12, wherein said fastening portions are received in corresponding recesses in said speaker cabinets, said fastening portions being arranged to extend downwardly from said speaker cabinets.

15. The speaker system of claim 12, further comprising a cover member extending between adjacent end portions of said speaker cabinets, said cover member having a cross-sectional shape substantially conforming with a cross-sectional shape of said adjacent end portions of said speaker cabinets, said cover member receiving said substantially rigid member.

16. A speaker apparatus adapted to be mounted across a ceiling of a vehicle, said apparatus comprising:
an elongated member including first and second end portions adapted to engage the vehicle at opposing locations adjacent the ceiling, first and second speaker cabinets located adjacent said first and second end portions, respectively, and a third portion between said first and second speaker cabinets; and
means for adjusting the length of said third portion.

17. The speaker apparatus of claim 16, wherein said elongated member includes means for urging said third portion toward the ceiling.

18. The speaker apparatus of claim 16, wherein said means for adjusting the length of said third portion includes a telescoping connection between said third portion and said speaker cabinets.

19. The speaker apparatus of claim 18, further comprising means for adjusting the length of said end portions.

* * * * *